United States Patent Office 3,105,080
Patented Sept. 24, 1963

3,105,080
2-OXO-1-PYRROLIDINEPROPIONATES
Richard A. Hickner, Midland, Mich., assignor to The Dow Chemical Company, Midland, Mich., a corporation of Delaware
No Drawing. Filed Oct. 30, 1961, Ser. No. 148,702
4 Claims. (Cl. 260—326.3)

This invention relates to new chemical compounds, 2-oxo-1-pyrrolidinepropionates, and to processes for their preparation.

The compounds of the present invention have the formula:

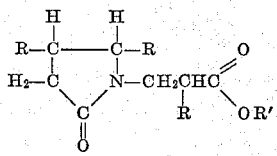

wherein each R independently represents either hydrogen or an alkyl group containing from 1 to 4 carbon atoms and R' represents either an alkyl group containing from 6 to 22 carbon atoms or the phenyl or the cyclohexyl group.

The novel compounds are conveniently prepared by reacting a 2-pyrrolidinone having the formula:

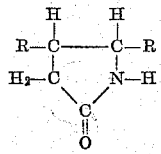

wherein R has the same significance as previously described, with an acrylic ester having the formula:

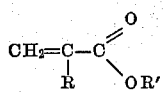

wherein R and R' each have the same significance as previously described. A suitable catalyst is also preferably employed in the reaction. Examples of catalysts which may be utilized are the hydroxides, the alkoxides, and the hydrides of the alkali metals, and quaternary ammonium hydroxides. The catalyst is suitably employed at a concentration of from about 1 to 10 percent by weight of the pyrrolidinone used. The reaction is conducted advantageously at temperatures of from about 20° to 100° C. with a range of from about 20° to 55° C. being preferred. Said reaction is maintained for a sufficient length of time to effect substantial completion; normally from 3 to 6 hours are sufficient. The 2-oxo-1-pyrrolidinepropionate thus prepared is then conveniently separated from the reaction mixture, as by distillation, and further purified, if desired.

The novel compounds are also conveniently prepared by a second process which comprises reacting methyl or ethyl 2-oxo-1-pyrrolidinepropionate with an aliphatic alcohol containing from 6 to 22 carbon atoms. The alcoholysis reaction is preferably carried out at from about 25° to 225° C. and in the presence of a strong acid catalyst, such as concentrated sulfuric acid, orthophosphoric acid, and p-toluenesulfonic acid.

Although virtually any ratio of 2-pyrrolidinone to acrylic ester, or of pyrrolidinepropionate to alcohol, will result in the formation of some of the desired product, a 1:1 mole ratio is preferred with either pair of reactants for convenience and economy of operation.

The practice of the present invention is illustrated by the following examples.

EXAMPLE I

Into a 250-ml. flask fitted with a Vigreux column was placed a mixture of 53.7 grams (0.29 mole) of ethyl 2-oxo-1-pyrrolidinepropionate, 61.2 grams (0.6 mole) of n-hexanol, and 50 ml. of benzene. The mixture was heated and a portion of the benzene distilled to remove traces of water from the system. Then 0.5 ml. of concentrated sulfuric acid was added to the flask and the reaction mixture was gradually heated to 190° C. and maintained thereat for 3 hours. One fraction was then distilled at 70–115° C. and 0.4 mm. pressure. The residue was dissolved in methylene chloride and washed with N/1 sodium hydroxide and then with water. The solution was dried with anhydrous calcium sulfate, then filtered, the methylene chloride removed by distillation, and the desired product, n-hexyl 2-oxo-1-pyrrolidinepropionate, also was distilled at 139–142° C. and 0.01 mm. pressure. There were obtained 51 grams (73 percent of the theoretical, based on the ester used) of a water-white liquid having $n_D^{25}$ of 1.4664.

EXAMPLE II

One gram of powdered sodium hydroxide was suspended in 85 grams (1.0 mole) of 2-pyrrolidinone in 50 ml. of dry dioxane. Then 184 grams (1.0 mole) of 2-ethylhexyl acrylate were added at 30°–35° C. over a period of 80 minutes. Two additional 0.5 gram portions of sodium hydroxide were also added during the 80-minute period. The mixture was then stirred and heated for four hours at 40° C. and then neutralized with acetic acid and distilled, yielding 35 grams of unreacted pyrrolidinone and 127 grams (47 percent of the theoretical, based on reactants used) of 2-ethylhexyl 2-oxo-1-pyrrolidinepropionate, boiling at 140°–143° C. at a pressure of 1 mm. and having $n_D^{25}$ of 1.4680.

EXAMPLE III

A mixture of 37.0 grams (0.2 mole) of ethyl 2-oxo-1 pyrrolidinepropionate and 54.0 grams (0.2 mole) of octadecyl alcohol was reacted in a manner similar to that in Example I. After heating for three hours at 190° C. a lower boiling fraction was removed at 170° C. and 0.5 mm. pressure. The remainder of the reaction mixture was neutralized with sodium hydroxide, washed with water, and heated under vacuum at 110° for three hours to remove the water. The desired product, which remained as a residue, could not be distilled. There were obtained 55 grams (70 percent of the theoretical, based on reactants used) of octadecyl 2-oxo-1-pyrrolidinepropionate, having $n_D^{25}$ of 1.4690.

The ethyl 2-oxo-1-pyrrolidinepropionate used as a starting material in Examples I and III was prepared by reacting 2-pyrrolidinone and ethyl acrylate in a manner similar to that described in Example II.

The compounds of the present invention have valuable utility as plasticizers for polyvinyl chloride. This valuable utility was illustrated in the preparation of three polyvinyl chloride formulations in each of which 100 parts by weight of Dow 133–4 polyvinyl chloride, 50 parts by weight of plasticizer, 5 parts by weight of Paraplex G–62 (epoxidized soybean oil, Rohm & Haas Co.), and 3 parts by weight of a barium-cadmium stabilizer (Harshaw 12–V–6) were mixed and milled in a two-roll mill at 160° F. until tough, homogeneous sheets were obtained. There are shown in Table I for each formulation prepared the ester of 2-oxo-1-pyrrolidinepropionic acid employed as plasticizer and the tensile strength and percent elongation determined on each of the formulations.

Table I

| Ester | Tensile Strength, p.s.i. | Elongation, Percent |
|---|---|---|
| Hexyl | 1,460 | 475 |
| Decyl | 1,945 | 485 |
| Octadecyl | 2,780 | 470 |

The methyl, ethyl, propyl and butyl esters of 2-oxo-1-pyrrolidinepropionate are impractical for use as plasticizers in the above formulations due to their high solubility in water and high volatility.

The compounds of the present invention also have valuable utilities as antifoam agents and defoaming agents and as wetting agents. These novel compounds are far superior as antifoam agents and as wetting agents to the methyl, ethyl, propyl and butyl esters of 2-oxo-1-pyrrolidinepropionate.

In addition to those already disclosed, other compounds within the scope of the present invention include, for example, the n-heptyl, 2,3,3-trimethylamyl, n-nonyl, 3,3-dimethyloctyl, 4-ethyldecyl, 4,6-dimethyldodecyl, 2,4-dimethyl-6-ethyldodecyl, 4,6-diethyltetradecyl, 2,6-dimethyl-5,8-diethyltetradecyl and 3-n-propyl-5-methyl-6-ethylhexadecyl 2-oxo-1-pyrrolidinepropionates.

This application is a continuation-in-part of my pending application, Serial No. 5,598, filed February 1, 1960, now abandoned.

I claim:
1. A 2-oxo-1-pyrrolidinepropionate having the formula:

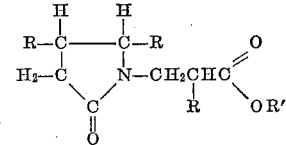

wherein each R is a radical independently selected from the group consisting of hydrogen and an alkyl of 1 to 4 carbon atoms and R' is a radical selected from the group consisting of alkyl groups containing from 6 to 22 carbon atoms, phenyl, and cyclohexyl.

2. n-Hexyl 2-oxo-1-pyrrolidinepropionate.
3. 2-ethylhexyl 2-oxo-1-pyrrolidinepropionate.
4. n-Octadecyl 2-oxo-1-pyrrolidinepropionate.

References Cited in the file of this patent
UNITED STATES PATENTS
2,935,515   Larrabee _____ May 3, 1960

OTHER REFERENCES

Reppe et al.: "Chemical Abstracts," Volume 50, page 16787d (1956).